(12) United States Patent
Damento et al.

(10) Patent No.: US 10,732,117 B2
(45) Date of Patent: Aug. 4, 2020

(54) DEVICE FOR ANALYZING THE MATERIAL COMPOSITION OF AN OBJECT VIA PLASMA SPECTRUM ANALYSIS HAVING A LONG PASS FILTER

(71) Applicant: Rigaku Analytical Devices, Inc., Wilmington, MA (US)

(72) Inventors: Michael Anthony Damento, Tucson, AZ (US); Scott Charles Buchter, Espoo (FI); Stanislaw Piorek, Hillsborough, NJ (US)

(73) Assignee: Rigaku Analytical Devices, Inc., Wilmington, MA (US)

( * ) Notice: Subject to any disclaimer, the term of this patent is extended or adjusted under 35 U.S.C. 154(b) by 108 days.

(21) Appl. No.: 16/163,048

(22) Filed: Oct. 17, 2018

(65) Prior Publication Data

US 2020/0124536 A1   Apr. 23, 2020

(51) Int. Cl.
*G01N 21/71* (2006.01)

(52) U.S. Cl.
CPC ... *G01N 21/718* (2013.01); *G01N 2201/0636* (2013.01); *G01N 2201/06113* (2013.01); *G01N 2201/08* (2013.01)

(58) Field of Classification Search
CPC ....... G01N 21/718; G01J 3/2823; G01J 3/443
See application file for complete search history.

(56) References Cited

U.S. PATENT DOCUMENTS 6,449,932 B1   9/2002   Cooper et al.

FOREIGN PATENT DOCUMENTS

| CN | 106 596 511 A | 4/2017 |
| CN | 107 782 718 A | 3/2018 |

OTHER PUBLICATIONS

International Search Report, International Application No. PCT/US2019/055356, dated Jan. 2, 2020, 4 pgs.

*Primary Examiner* — Maurice C Smith
(74) *Attorney, Agent, or Firm* — Brinks Gilson & Lione

(57) ABSTRACT

A device for analyzing the material composition of a sample via plasma spectrum analysis includes a laser assembly configured to emit a beam for plasma spectrum analysis, an optical assembly configured to direct the beam towards a sample for plasma spectrum analysis of the sample and collect a reflected light reflected by the sample. The optical assembly includes a long-wave pass optical filter arrangement which is configured to pass a first portion of the reflected light reflected by the sample and reflect a second portion of the reflected light reflected by the sample to a spectrometer.

19 Claims, 4 Drawing Sheets

DEVICE FOR ANALYZING THE MATERIAL COMPOSITION OF AN OBJECT VIA PLASMA SPECTRUM ANALYSIS HAVING A LONG PASS FILTER

BACKGROUND

1. Field of the Invention

The present invention generally relates to laser-induced breakdown spectroscopy systems.

2. Description of Related Art

Laser-induced breakdown spectroscopy ("LIBS") is a type of atomic emission spectroscopy which uses a highly energetic laser pulse as the excitation source. The laser is focused to form a plasma, which atomizes and excites samples. In principle, LIBS can analyze any matter regardless of its physical state, be it solid, liquid, or gas. Because all elements emit light of characteristic frequencies when excited to sufficiently high temperatures, LIBS can detect all elements, limited only by the power of the laser beam utilized as well as the sensitivity and wavelength range of the spectrograph and detector.

If the constituents of a material to be analyzed are known, LIBS may be used to evaluate the relative abundance of each constituent element, or to monitor the presence of impurities. In practice, detection limits are a function of a) the plasma excitation temperature, b) the light collection window, and c) the line strength of the viewed transition. LIBS makes use of optical emission spectrometry and is to this extent very similar to arc/spark emission spectroscopy.

LIBS operate by focusing the laser beam onto a small area at the surface of the specimen When the laser beam is discharged it ablates a very small amount of material, in the range of nanograms to picograms, which generates a plasma plume with temperatures in excess of 100,000 K. During data collection, typically after local thermodynamic equilibrium is established, plasma temperatures range from 5,000-20,000 K. At the high temperatures during the early plasma, the ablated material dissociates (breaks down) into excited ionic and atomic species. During this time, the plasma emits a continuum of radiation which does not contain any useful information about the species present, but within a very small timeframe the plasma expands at supersonic velocities and cools. At this point the characteristic atomic emission lines of the elements can be observed.

SUMMARY

A device for analyzing the material composition of a sample via plasma spectrum analysis includes a laser assembly configured to emit a beam for plasma spectrum analysis, an optical assembly configured to direct the beam towards a sample for plasma spectrum analysis of the sample and collect a reflected light reflected by the sample. The optical assembly includes a long-wave pass optical filter arrangement which is configured to pass a first portion of the reflected light reflected by the sample and reflect a second portion of the reflected light reflected by the sample to a spectrometer. The first portion of the reflected light reflected by the sample may have a wavelength greater than 800 nm and the second portion of the reflected light reflected by the sample may have a wavelength less than 800 nm.

The optical assembly may include a parabolic mirror with an aspheric or parabolic surface profile configured to receive a laser beam at non-normal incidence along a first axis. The optical assembly is configured such that the parabolic mirror directs the beam to the sample for plasma spectrum analysis along a second axis. The reflected light reflected by the sample is collected coaxially along the second axis and redirected along the first axis in an opposite direction by the parabolic mirror and to the long-wave pass optical filter arrangement. The long-wave pass optical filter arrangement may include a long-wave pass optical filter and/or a dichoic mirror.

Further objects, features, and advantages of this invention will become readily apparent to persons skilled in the art after a review of the following description, with reference to the drawings and claims that are appended to and form a part of this specification.

DETAILED DESCRIPTION

Figure 1:
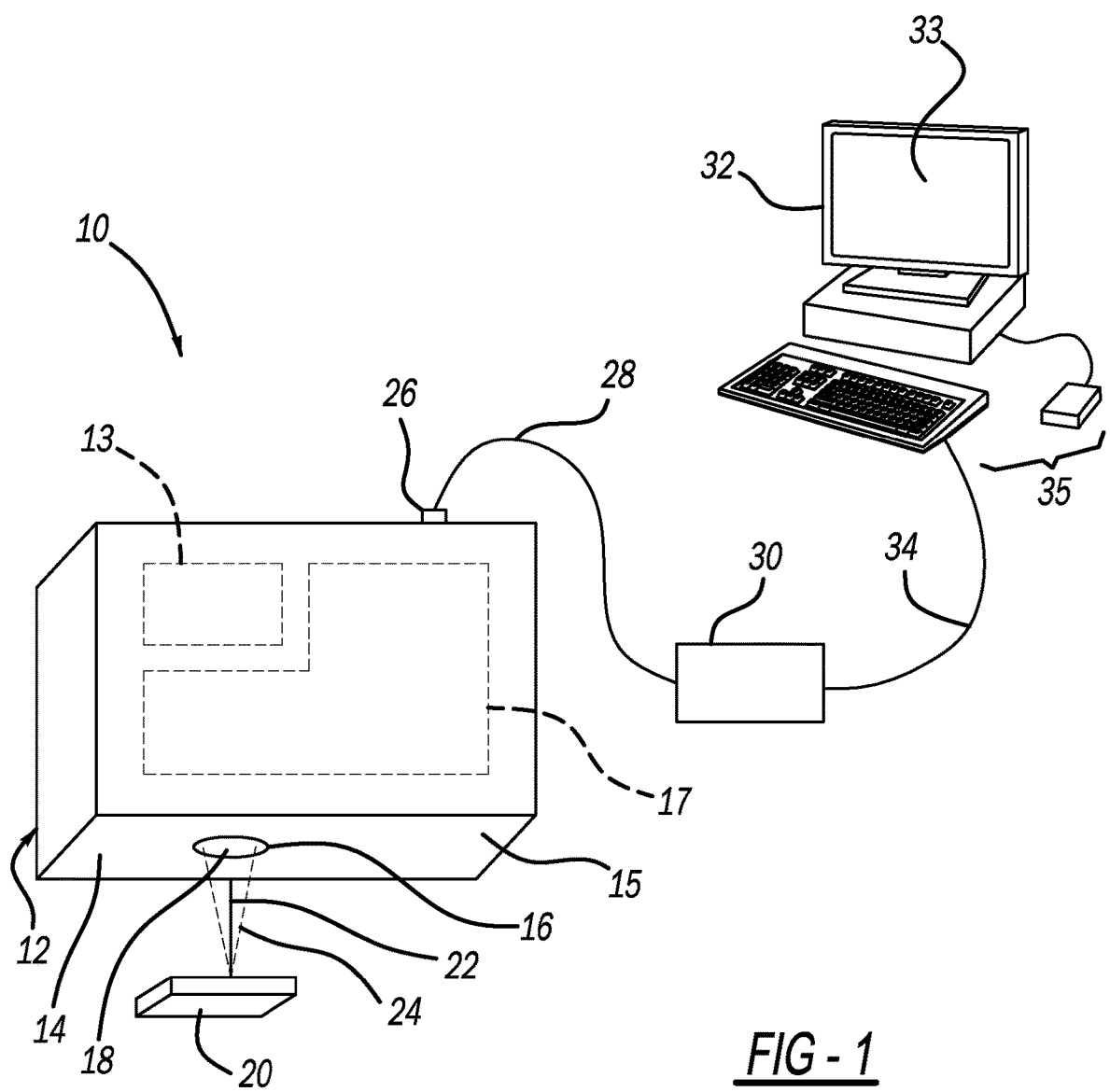
FIG. 1 illustrates a block diagram of a system for analyzing the material composition of a sample via plasma spectrum analysis.

Referring to FIG. 1, a system 10 for analyzing the material composition of a sample 20 by spectrum analysis is shown. As its primary components, the system 10 includes a device 12 for analyzing the material composition of the sample 20. The sample 20 may be any sample capable of having its material composition analyzed. Here, the sample 20 may be carbon steel. The system 10 allows one to determine the carbon content in low alloys and carbon steels.

The device 12 may include a housing 14 which may enclose a number of components that will be described in FIGS. 2A and 2B and later in this description. For example, the housing 14 may include a laser assembly 13 for producing a laser beam 22 and an optical assembly 17 for directing a laser beam 22 to the sample 20. In addition, the optical assembly 17 may function to direct plasma emitted light 24 (light reflected from the sample 20) to a spectrometer 30 via an optical fiber 28. The device 12 may be a handheld device.

The device 12 has two primary functions. The device 12 provides beam shaping and delivery for the laser beam 22 and also efficiently collects the plasma emitted light 24 from the plasma for delivery to the spectrometer 30. The laser beam 22 may be a single mode laser beam having a focused diameter of 20 microns on the sample 20 in order to generate a strong plasma plume. The working distance may be around or greater than 10 mm.

A wall portion 15 of the housing 14 may have an opening 16 formed therein. The opening 16 may contain a window 18. The window 18 may be a transparent window allowing for the transmission of light to and from the device 12, such as the laser beam 22 and the plasma emitted light 24. The housing 14 may be hermetically sealed and may be filled with an inert gas.

As stated before, the device 12 is configured to emit a laser beam 22 towards the sample 20. When the laser beam 22 strikes the sample 20, a plasma plume is formed and plasma emitted light 24 is reflected back to the window 18.

As will be described in more detail in FIGS. 2A and 2B, the plasma emitted light 24 is redirected to the spectrometer 30 via the optical fiber 28. The fiber adapter 26 optically directs the plasma emitted light 24 to the optical fiber 28. The optical fiber 28 in turn directs the plasma emitted light 24 to a spectrometer 30.

The spectrometer 30 may perform a number of different spectral analyses of the plasma emitted light 24 and converts these optical signals into electrical signals that are provided to digital analyzer 32.

The spectrometer 30 may include a monochromator (scanning) or a polychromator (non-scanning) and a photomultiplier or CCD (charge coupled device) detector, respectively. The spectrometer 30 collects electromagnetic radiation over the widest wavelength range possible, maximizing the number of emission lines detected for each particular element. The response of the spectrometer 30 may be from 1100 nm (near infrared) to 170 nm (deep ultraviolet).

The electrical signals generated by the spectrometer 30 may be provided to the digital analyzer 32 by a cable 34. However, it should be understood that any one of a number of different methodologies utilized to transmit digital data from separate devices may be employed. For example, the digital analyzer 32 may utilize a wireless protocol to communicate with the spectrometer 30. The digital analyzer 32 may be a dedicated device having an output device 33 and one or more input devices 35. The output device 33 may be a display, while the input device 35 may be a keyboard and/or a mouse.

Figure 2A:
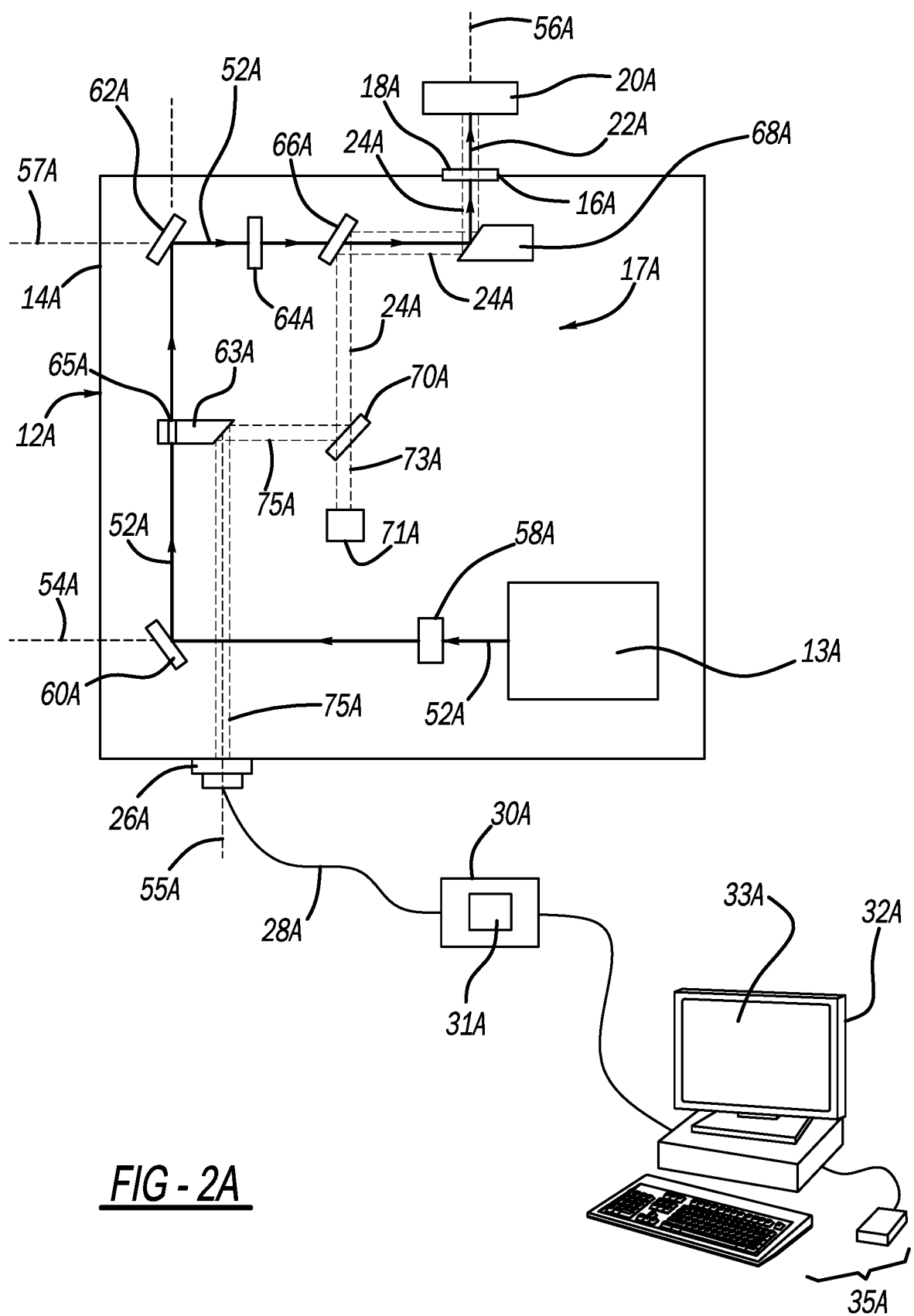
FIGS. 2A and 2B illustrate block diagrams of two different examples of the internal components of systems for analyzing the material composition of a sample via plasma spectrum analysis of FIG. 1.

Referring to FIG. 2A, one example of the device 12A is shown. The device 12A may also include a laser assembly 13A for generating a laser beam 22A and an optical assembly 17A for directing the laser beam 22A to the sample 20A. In addition, the optical assembly 17A may direct the plasma emitted light 24A reflected by the sample 20A towards the fiber coupler 26A. The laser assembly 13A may be a Nd:YAG laser that may generate energy in the near infrared region of the electromagnetic spectrum, with a wavelength of 1064 nm. The pulse duration may be in the region of 10 ns.

The laser assembly 13A is configured to output a laser beam 52A. The laser beam 52A is directed along an axis 54A towards a mirror 60A. From there, the laser beam 52A is directed from the mirror 60A to a second mirror 62A. The second mirror 62A directs the laser to a dichroic mirror 66A. Here, when the beam 52A is reflected by the mirror 60A, the beam 52A is shown to pass through a portion of a parabolic mirror 63A. This parabolic mirror 63A has a small slot 65A to allow the beam 52A to pass there through. Essentially, in this example, the beam 52A is able to pass through a portion of the parabolic mirror 63A. This arrangement may be advantageous as it allows the device 12A to be located in a smaller housing, as the parabolic mirror 63A may be partially disposed within the path of the beam 52A.

The dichroic mirror 66A has the ability to reflect light at one wavelength, while allowing light at a different wavelength to pass through. Here, the dichroic mirror 66A may allow the laser beam 52A to pass through, which, as said previously, may be 1064 nm excitation light. Similarly, the dichroic mirror 66A may reflect the plasma emitted light 24A, which may be ultraviolet signal light. The dichroic mirror 66A allows both excitation laser beam 52A and signal collection to be coaxial.

The dichroic mirror 66A directs the laser beam 52A to first parabolic mirror 68A. The first parabolic mirror 68A directs the laser beam 52A (now laser beam 22A) towards the sample 20A along the axis 56A. It is noted that the axis 54A and the axis 56A have different angles. The axis 54A and the axis 56A may have angles that are substantially perpendicular to one another. The laser beam 22A may be directed to the sample 20A via the window 18A. As the laser beam 22A strikes the sample 20A, a plasma is generated.

The plasma emitted light 24A is a reflected light that is then directed back to the first parabolic mirror 68A along the axis 56A. The first parabolic mirror 68A redirects the plasma emitted light 24A along another axis 57A towards the dichroic mirror 66A. As stated before, the dichroic mirror 66A is reflective for certain wavelengths of light but is transmissive at other wavelengths. Here, the plasma emitted light 24A has such a wavelength that it will be substantially reflected by the dichroic mirror 66A to a long-wave pass optical filter 70A.

The long-wave pass optical filter 70A is configured to pass a first portion 73A of the light 24A reflected by the sample 20A. The first portion 73A of the reflected light 24 reflected by the sample 20 may have a wavelength greater than 800 nm. The optical assembly 17 may also include a light trap 71A. The light trap 71A is located within the housing 14A and is configured to receive the first portion 73A of the light 24A reflected by the sample 20A. The light trap 71A essentially functions to sequester the light 73A that was not reflected by the long-wave pass optical filter 70A. By so doing, this prevents the light 73A from interfering with the light 75A that is of interest when determining the carbon content of the sample 20A if the sample 20A is carbon steel.

The long-wave pass optical filter 70A may be also configured to reflect a second portion 75A of the reflected light 24A reflected by the sample 20A. The second portion 75A of the reflected light 24A reflected by the sample 20A may have a wavelength less than 800 nm and may have a wavelength as low as approximately 180 nm. The long-wave pass optical filter 70A then directs the light 75A along an axis 55A towards a fiber coupler 26A. The fiber coupler 26A receives and focuses the light to an optical fiber 28A which then provides this light to a spectral analyzer 30A, which may have a spectrometer sensor 31A, which can then perform any one of a number of different analyses. For example, the spectral analyzer 30A may be able to determine the carbon content of the sample 20A by analyzing the light 75A provided to it via they fiber coupler 26A.

The optical assembly 17A may also include lenses 58A and 64A. The lens 58A is generally located between the laser assembly 13A and the mirror 60A. The lens 64A is generally located between the mirror 62A and the dichroic mirror 66. The lens 58A may have a positive or negative focal length, while the lens 64A will only have a positive focal length. The lenses 58A and 64A serve to the focus the laser beam 52A on the mirror 60A and the dichroic mirror 66A, respectively.

Figure 2B:
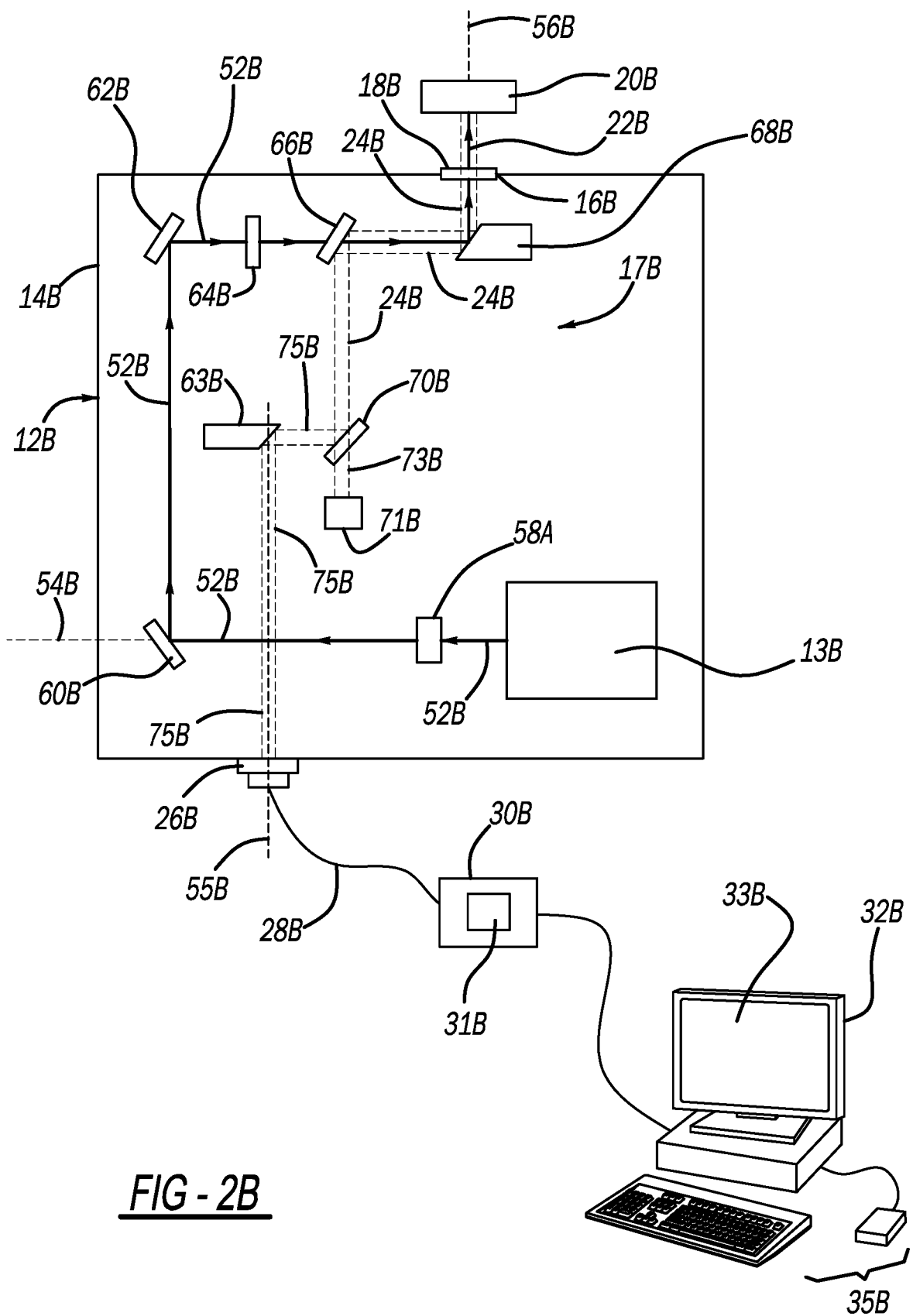

Referring to FIG. 2B, another example of the device 12B is shown. Here, like reference numerals have been utilized to refer to like elements. As such, no additional description will be provided as they have been adequately provided in the paragraphs above. In this example, the device 12B differs with regards to the placement of the second parabolic mirror 63B. Here, the second parabolic mirror 63B is located outside the path of the beam 52B reflected from the mirror 60B to the other mirror 62B. Because the beam 52B between the mirror 60B and 62B does not come into contact with the second parabolic mirror 63B, there is no need for the second parabolic mirror 63B to have a channel or slot (see 65A of FIG. 2A) for the beam 52B to pass through.

Figure 3:
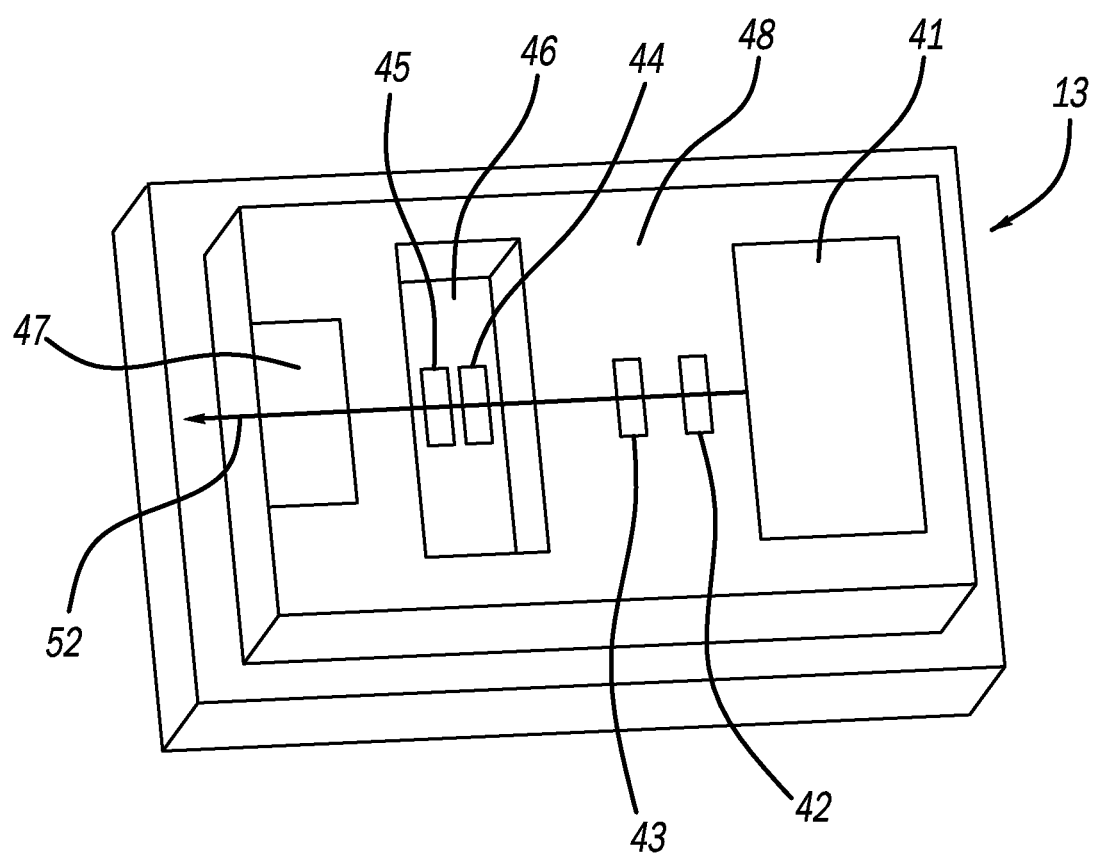
FIG. 3 illustrates a block diagram of a laser assembly for use with the system for analyzing the material composition of a sample via plasma spectrum analysis.

Referring to FIG. 3, a more detailed view of the laser assembly 13 is shown. The laser assembly 13 may be a diode-pumped solid-state laser. A diode-pumped solid-state laser pumps a solid gain medium, for example, a ruby or a neodymium-doped YAG crystal, with a laser diode.

As such, the laser assembly 13 includes a pump diode 41. Light emitted by the pump diode 41 is focused by lenses 42 and 43 and to a laser crystal 44. A q-switch 45 is provided thereafter. From there, the beam is provided to an output mirror 47 where it is outputted to the lens 58 of FIG. 2. A resonator is essentially formed by the reflecting surfaces in which the laser crystal 44 and a Q-switch 45 are arranged. The Q-switch 45 may be a passive Q-switch. Q switching is a technique for obtaining energetic short pulses from a laser by modulating the intracavity losses and thus the Q factor of the laser resonator. The technique is mainly applied for the generation of nanosecond pulses of high energy and peak power with solid-state bulk lasers.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

The invention claimed is:

1. A device for analyzing a material composition of a sample via plasma spectrum analysis, the device comprising:
   a laser assembly configured to emit a beam for plasma spectrum analysis;
   an optical assembly configured to direct the beam towards a sample for plasma spectrum analysis of the sample;
   the optical assembly being configured to collect a light reflected by the sample;
   a housing, the housing substantially enclosing the laser assembly and the optical assembly;
   wherein the housing defines at least one opening configured to allow the beam to travel from the optical assembly to the sample and to allow the light reflected by the sample to be collected by the optical assembly;
   wherein the optical assembly includes a long-wave pass optical filter arrangement, the long-wave pass optical filter arrangement being configured to pass a first portion of the light reflected by the sample, the first portion of the light reflected by the sample having a wavelength greater than 800 nm; and
   wherein the long-wave pass optical filter arrangement is configured to reflect a second portion of the reflected light reflected by the sample;
   a spectrometer configured to receive the second portion of the light, the second portion of the light reflected by the sample having a wavelength less than 800 nm.

2. The device for analyzing the material composition of the sample via plasma spectrum analysis of claim 1, wherein the second portion of light reflected by the sample has a wavelength as low as approximately 180 nm.

3. The device for analyzing the material composition of the sample via plasma spectrum analysis of claim 1, wherein sample is carbon steel.

4. The device for analyzing the material composition of the sample via plasma spectrum analysis of claim 1, wherein the device is a hand held device.

5. The device for analyzing the material composition of the sample via plasma spectrum analysis of claim 1, further comprising a light trap configured to receive the first portion of the of the light reflected by the sample and passed through the long-wave pass optical filter arrangement.

6. The device for analyzing the material composition of the sample via plasma spectrum analysis of claim 1, wherein the laser assembly emits 1064 nm light.

7. The device for analyzing the material composition of the sample via plasma spectrum analysis of claim 1, wherein the laser assembly is a q-switched laser assembly.

8. The device for analyzing the material composition of the sample via plasma spectrum analysis of claim 7, wherein the q-switched laser assembly comprises:
   a laser crystal;
   focusing elements;
   a pump radiation source whose pump radiation is focused through the focusing elements in the laser crystal; and
   a resonator comprising at least one laser crystal and a passive Q-switch.

9. The device for analyzing the material composition of the sample via plasma spectrum analysis of claim 1, wherein the optical assembly further comprises:
   a first parabolic mirror configured to receive the beam at non-normal incidence along a first axis;
   the optical assembly being configured such that the first parabolic mirror directs the beam to the sample for plasma spectrum analysis along a second axis, the second axis being different from the first axis;
   wherein the light reflected by the sample is collected coaxially along the second axis and redirected along the first axis in an opposite direction by the first parabolic mirror and to the long-wave pass optical filter arrangement; and
   the long-wave pass optical filter arrangement configured to redirect the second portion of the light reflected by the sample to the spectrometer.

10. The device for analyzing the material composition of the sample via plasma spectrum analysis of claim 9, further comprising a second parabolic mirror configured to receive the second portion of the light reflected by the sample and redirect the light reflected by the sample to the spectrometer.

11. The device for analyzing the material composition of the sample via plasma spectrum analysis of claim 9, wherein the long pass filter arrangement comprises:
   a dichroic mirror;
   a long pass filter;
   wherein the dichroic mirror is configured to allow the beam to pass from the laser assembly to the first parabolic mirror and wherein the dichroic mirror is configured to reflect the light reflected by the sample towards the long pass filter; and
   wherein the long pass filter is configured to reflect the second portion of the light reflected by the sample to the spectrometer.

12. The device for analyzing the material composition of the sample via plasma spectrum analysis of claim 11, further comprising a second parabolic mirror configured to receive the second portion of the reflected light from the long pass filter and redirect the second portion of the reflected light to the spectrometer.

13. The device for analyzing the material composition of the sample via plasma spectrum analysis of claim 12, wherein:
   the second parabolic mirror has a slot formed on a side of the second parabolic mirror; and
   wherein the beam is directed through the slot.

14. The device for analyzing the material composition of the sample via plasma spectrum analysis of claim 11, further comprising a second parabolic mirror configured to receive the second portion of the light reflected by the sample and redirect the light reflected by the sample to the spectrometer.

15. The device for analyzing the material composition of the sample via plasma spectrum analysis of claim 14, further comprising a fiber adapter, the fiber adapter being configured to receive the second portion of the light reflected by the sample from the second parabolic mirror, the fiber adapter is configured to optically direct the second portion of the light reflected by the sample to an optical fiber, the optical fiber being in optical communication with the spectrometer.

16. The device for analyzing the material composition of the sample via plasma spectrum analysis of claim 15, wherein:
   the second parabolic mirror has a slot formed on a side of the second parabolic mirror; and
   the first mirror being configured to direct the beam through the slot and to the second mirror.

17. The device for analyzing the material composition of the sample via plasma spectrum analysis of claim 9, wherein the optical assembly further comprises:
   a first reflective mirror configured to receive the beam from the laser assembly;
   a second reflective mirror, the first reflective mirror being configured to direct the beam to the second reflective mirror, the second reflective mirror being configured to receive the beam from the first reflective mirror; and
   the first parabolic mirror configured to receive the beam from the second reflective mirror and direct the beam to the sample.

18. The device for analyzing the material composition of the sample via plasma spectrum analysis of claim 17, wherein the optical assembly further comprises:
   a first lens located between laser assembly and the first reflective mirror, the first lens being configured to focus the beam from the laser assembly to first reflective mirror, the first lens having a positive or negative focal length; and
   a second lens located between the second reflective mirror and the first parabolic mirror, the second lens being configured to focus the beam from the second reflective mirror to the first parabolic mirror, the second lens having a positive focal length.

19. The device for analyzing the material composition of the sample via plasma spectrum analysis of claim 1, further comprising a fiber adapter, the fiber adapter being configured to receive the second portion of the light reflected by the sample, the fiber adapter is configured to optically direct the second portion of the light reflected by the sample to an optical fiber, the optical fiber being in optical communication with the spectrometer.

* * * * *